Patented May 13, 1947

2,420,295

UNITED STATES PATENT OFFICE 2,420,295

4,4'-DICHLORODIPHENYL 1,1,1-TRICHLORO-ETHANE DISPERSED IN POLYVINYL ACETATE

Gordon F. Biehn, Hockessin, and James E. Kirby, Wilmington, Del., assignors to E. I. du Pont de Nemours & Company, Wilmington, Del., a corporation of Delaware No Drawing. Application August 9, 1944, Serial No. 548,806

10 Claims. (Cl. 167—30)

This invention relates to compositions and methods for their manufacture and is particularly directed to the preparation of aqueous dispersions of 4,4'-dichlorodiphenyl-1,1,1-trichloroethane suitable for the control of insects and like pests.

4,4'-dichlorodiphenyl-1,1,1 - trichloroethane of late has become of great interest as an insect poison and its manufacture and composition for this purpose are disclosed in U. S. Patent 2,329,074 and British Patents 547,871 and 547,874. In the British patents there are disclosed compositions of water-dispersible character which, however, have the disadvantages characteristic of solvents, inert diluents, and wetting agents. Organic solvents frequently contribute phytotoxicity; inert diluents produce unnecessarily heavy deposits per unit of toxicant; and wetting agents cause excessive run-off of foliage and lower the resistance of the deposits to weathering. In these and other respects the compositions of the prior art are not entirely satisfactory, especially for plant sprays.

This invention has for its objects to provide compositions particularly suitable for the control of insect pests; to provide compositions adapted to spraying foliage; to provide compositions readily dispersible in water; to provide water-dispersible compositions without solvents or inert diluents; to provide compositions capable of depositing heavy continuous films on foliage which are resistant to weathering; to provide compositions and methods particularly suited for dispersing crude 4,4'-dichlorodiphenyl-1,1,1-trichloroethane in water; to overcome the disadvantages of the prior art and to obtain advantages as will appear hereinafter. Further objects will become apparent as the description proceeds.

These objects are accomplished in the present invention by effecting dispersion of 4,4'-dichlorodiphenyl-1,1,1-trichloroethane in water by means of a water-soluble hydrolyzed polyvinyl acetate.

Compositions prepared according to the invention give stable dispersions of 4,4'-dichlorodiphenyl-1,1,1-trichloroethane in water which are suitable for use in the pest control art wherever aqueous dispersions are customarily employed and are particularly suitable for application to foliage in that when applied to foliage the dispersion dries down to a heavy continuous film which is highly resistant to washing and weathering. The more common aqueous dispersions of insecticidal material tend to wash off unless an adhesive agent is supplied simultaneously with the application of the spray and frequently the coverage obtained is blotchy and non-uniform. With compositions of the invention such adhesive agents are unnecessary because once the film has dried on the foliage the hydrolyzed polyvinyl acetate acts as a binder to prevent washing off of the insecticide. Water-soluble hydrolyzed polyvinyl acetate does not promote run-off but rather aids in building up heavy deposits. Moreover, while easily soluble under proper conditions, it is not readily dissolved in the dried residue of the spray. The spray deposit accordingly has extraordinary resistance to weathering.

An unusual and extraordinary characteristic of the compositions of the invention is that the hydrolyzed polyvinyl acetate caused the spray to spread evenly and uniformly upon foliage and to dry down to a smooth, heavy, insoluble deposit.

The dispersing agents utilized in accordance with the invention and referred to herein as water-soluble hydrolyzed polyvinyl acetate are obtained, as may be inferred from this nomenclature, by hydrolyzing polyvinyl acetate to the degree required to impart water solubility. This may be a complete or a partial hydrolysis. Such hydrolyzed polyvinyl acetates which are water-soluble are generally well known to have emulsifying and dispersing properties, which vary somewhat according to the degree of polymerization of the polyvinyl acetate and to the degree of saponification. Some products are soluble in cold water but relatively insoluble in hot water while others relatively are insoluble in cold water but are soluble in hot water. But even those which are most soluble in cold water when utilized according to the invention give deposits on foliage which are highly weather resistant.

The invention is particularly suited to the preparation of aqueous dispersions of crude 4,4'-dichlorodiphenyl-1,1,1-trichloroethane because of the difficulty of obtaining stable dispersions of the crude, and in its broader aspects it is applicable to the purified product. 4,4'-dichlorodiphenyl-1,1,1,-trichloroethane is obtained by effecting condensation of monochlorobenzene and a chloral-yielding compound in the presence of sulfuric acid. The product without purification, e. g., by crystallizing from alcohol or petroleum ether as in the above patents, is a mixture of several isomers and unidentified side-reaction products. The mixture has no sharp melting point and has a tendency to undercool and to become sticky at relatively low temperatures. The quality of the crude is determined empirically by its setting point. The fused crude is cooled slowly and uniformly and a cooling curve is taken. Ordinarily, because the crude tends to supercool, the temperature gradually drops to a nadir then rises two or three degrees to a peak, and thereafter drops gradually. The temperature of the arrest, i. e., the peak, is the setting point. The setting point varies according to the method of preparation of the crude 4,4'-dichlorodiphenyl-1,1,1-trichloroethane and may range from 80 or lower up to above 90° C. It may vary a few degrees according to its method of determination. Ordinarily the crude material will not have a setting point above about 95° C. and will most commonly be within two or three degrees of 90° C. With such crude material the problems of providing suitable water-dispersible formulations are encountered particularly and are simply and effectively solved by the present invention.

The compositions according to the invention are prepared by dissolving the water-soluble hydrolyzed polyvinyl acetate in water to a clear solution of the concentration desired, preferably to form an emulsion concentrate. The requisite quantity of 4,4'-dichlorodiphenyl-1,1,1-trichloroethane is then fused and dispersed with agitation in this aqueous solution. Alternatively a solution of 4,4'-dichlorodiphenyl-1,1,1-trichloroethane in methanol may be poured into a hot aqueous solution of the water-soluble hydrolyzed polyvinyl acetate. Other solvents, such as ethyl alcohol, acetone, chloroform, or toluene, which are sufficiently volatile or form sufficiently volatile binary mixtures with water to be vaporized by the hot water may be used. There are thus obtained stable emulsions which on cooling change over to a suspension. In other words, the composition is first prepared as an emulsoid which on cooling becomes a soliquoid.

According to a preferred aspect of the invention the proportions are adjusted to provide a concentrated soliquoid. By suitably limiting the quantity of water there is obtained a stable dispersion which may be shipped and stored without objectionable separation. Such a concentrate may then be dispersed in water to spray strength at the point of use.

To obtain the desired stability in the concentrate the dispersed phase should constitute at least about 20% of the dispersion. Ordinarily this will consist essentially of 4,4'-dichlorodiphenyl-1,1,1-trichloroethane alone or in admixture with other toxicant, though within the scope of the invention there may be included other materials.

The compositions according to the invention are prepared by dissolving the water-soluble hydrolyzed polyvinyl acetate in water, with heating if necessary, to a clear solution of the concentration desired. While this solution is hot, fused 4,4'-dichlorodiphenyl-1,1,1-trichloroethane is run in with agitation or its otherwise dispersed in the solution to form an emulsion. It is desirable to include in the fused 4,4'-dichlorodiphenyl-1,1,1-trichloroethane a minor proportion of a solvent for the 4,4'-dichlorodiphenyl-1,1,1-trichloroethane in order to improve the stability of the dispersion. The solvent is not used in sufficiently large quantities to dissolve the 4,4'-dichlorodiphenyl-1,1,1-trichloroethane. Rather, it is the solvent which is dissolved in 4,4'-dichlorodiphenyl-1,1,1-trichloroethane. Its function is to retard or prevent crystallization of the 4,4'-dichlorodiphenyl-1,1,1-trichloroethane in the emulsion and is particularly effective for this purpose with crude 4,4'-dichlorodiphenyl-1,1,1-trichloroethane.

The invention may be more fully understood by reference to the following examples in which the parts are by weight unless otherwise specified.

*Example 1*

25 parts of crude 4,4'-dichlorodiphenyl-1,1,1-trichloroethane having a setting point of 88° C. were melted and added, with agitation, to 75 parts of an aqueous solution containing 4 parts of water-soluble hydrolyzed polyvinyl acetate at 80° C. The water-soluble hydrolyzed polyvinyl acetate was a proprietary product having the following specifications:

Saponification number 137–167 (percent saponified 85–88) and viscosity of 35–45 centipoises in a 4% aqueous solution at 20° C.

There is obtained a thick creamy emulsion having satisfactory stability at room temperatures.

*Example 2*

The process of Example 1 was repeated using 25 parts of crude 4,4'-dichlorodiphenyl-1,1,1-trichloroethane having a setting point of 88° C. to which had been added 10% of tetrahydronaphthalene. There was obtained a product similar to that of Example 1 but having greater stability.

*Example 3*

The process of Example 1 was repeated using pure 4,4'-dichlorodiphenyl-1,1,1-trichloroethane (melting point 108° C.) and a similar emulsion of greater stability was obtained.

*Example 4*

The process of Example 2 was repeated using pure 4,4'-dichlorodiphenyl-1,1,1-trichloroethane (melting point 108° C.) and a similar emulsion of greater stability was obtained.

While the invention has been disclosed with reference to particular examples, it will be understood that variation may be made therein without departing from the spirit and scope of the invention.

In place of tetrahydronaphthalene there may be substituted other solvents for 4,4'-dichlorodiphenyl-1,1,1-trichloroethane. The solvent should be water-insoluble in order not to be drawn out of the dispersed phase of the emulsion by the aqueous dispersion medium. Solvents such as cyclohexanol, cyclohexanone, methylethylketone, dioxane, acetylacetone, toluene, xylene, decahydronaphthalene, alpha-methylnaphthalene, pinene, terpineol, terpene, and the like may be used. The solvent should be employed in a quantity smaller than the quantity of 4,4'-dichlorodiphenyl-1,1,1-trichloroethane so that there is obtained a solution of the solvent in 4,4'-dichlorodiphenyl-1,1,1-trichloroethane as contradistinguished from a solution of 4,4'-dichlorodiphenyl-1,1,1-trichloroethane in a solvent. A smaller quantity is desirable, say from between about 5 and about 15% based on the quantity of the 4,4'-dichlorodiphenyl-1,1,1-trichloroethane, and even smaller quantities may be used with the effect diminishing as the quantity diminishes.

In place of the particular grade of water-soluble partially hydrolyzed polyvinyl acetate given in the examples there may be substituted other grades. A material 90–92% saponified (saponification number 104–116) having viscosity of 15–25 centipoises in 4% aqueous solution at 20° C. is suitable. The polyvinyl acetate may be modified by polymerizing the vinyl acetate together with a low proportion of ethylene, vinylchloride, or vinylfluoride. The completely hydrolyzed polymer or interpolymer may be employed but the partially hydrolyzed polymers are most suitable. The material should be saponified sufficiently to make it water-soluble. Ordinarily a material having a saponification number of 245 or less will be satisfactory. Extraordinarily good results may be obtained with material having a saponification number between about 80 and about 245 and a viscosity of about 15 to about 55 centipoises in a 4% aqueous solution at 20° C. Material having a lower saponification number down to and including zero (the completely hydrolyzed polymer) and a viscosity as low as about 5 centipoises in 4% aqueous solution at 20° C. may be used.

The proportions of dispersed phase, dispersion medium and dispersing agent are not critical and those skilled in the art having reference to the purposes and objects of the invention will be able to select suitable proportions. Ordinarily the dispersed phase should not exceed about 30% if the emulsion is not to set up as a solid paste. About 25% dispersed phase gives a satisfactorily fluid emulsion or dispersion which pours easily and disperses well in water. For final spray dilutions the dispersion may be as dilute as desired. For spray concentrates, however, it is desired that the dispersion be as concentrated as possible without it becoming too thick for easy handling. Such concentrates should be sufficiently concentrated that the dispersion does not break. The breaking point is not sharply defined but the nearer it is approached the larger the amount of dispersing agent required for stability. In order to keep this down and to obtain desired stability the concentrate should contain at least about 15% of dispersed phase. The amount of water-soluble hydrolyzed polyvinyl acetate sufficient to give a stable dispersion may readily be determined by those skilled in the art having reference to the examples and the description of the invention. Ordinarily from about 0.5 to about 10 parts per 100 parts of 4,4'-dichlorodiphenyl-1,1,1-trichloroethane will be sufficient according to the amount of 4,4'-dichlorodiphenyl-1,1,1-trichloroethane in the dispersion.

There may be included in the dispersed phase along with the 4,4'-dichlorodiphenyl-1,1,1-trichloroethane other toxicants such as pyrethrum, derris extractives including rotenone and its congeners, toxic oils such as corn oil, thiocyanates such as Lethane and Loro, nicotine and its congeners or esters of unsaturated polybasic acids such as dialkyl maleates and fumarates and trialkyl aconitate. Such additional toxicants may be incorporated in the 4,4'-dichlorodiphenyl-1,1,1-trichloroethane with or without a blending agent prior to effecting dispersion, or they may be separately dispersed.

We claim:

1. A composition of matter comprising a toxicant containing 4,4'-dichlorodiphenyl-1,1,1-trichloroethane as an essential active ingredient dispersed in an aqueous solution of a water-soluble hydrolyzed polyvinyl acetate.

2. A composition of matter comprising a toxicant containing 4,4'-dichlorodiphenyl-1,1,1-trichloroethane as an essential active ingredient dispersed in an aqueous solution of a water-soluble hydrolyzed polyvinyl acetate which has a saponification number between about 80 and about 245 and a viscosity in a 4% aqueous solution at 20° C. between about 15 and about 55 centipoises.

3. A composition of matter consisting in a dispersion the dispersion medium of which is an aqueous solution of a water-soluble hydrolyzed polyvinyl acetate and the dispersed phase of which consists mainly of 4,4'-dichlorodiphenyl-1,1,1-trichloroethane.

4. A composition of matter consisting in a dispersion the dispersion medium of which is an aqueous solution of a water-soluble hydrolyzed polyvinyl acetate and the dispersed phase of which consists mainly of 4,4'-dichlorodiphenyl-1,1,1-trichloroethane and a lesser quantity of a solvent for 4,4'-dichlorodiphenyl-1,1,1-trichloroethane.

5. A composition of matter consisting in an aqueous dispersion the dispersion medium of which is an aqueous solution of a water-soluble hydrolyzed polyvinyl acetate having a saponification number of about 80 to about 245 and a viscosity in 4% aqueous solution at 20° C. of between about 15 and 55 centipoises and the dispersed phase of which consists mainly of 4,4'-dichlorodiphenyl-1,1,1-trichloroethane.

6. A composition of matter consisting in an aqueous dispersion the dispersion medium of which is an aqueous solution of a water-soluble hydrolyzed polyvinyl acetate having a saponification number of about 80 to about 245 and a viscosity in 4% aqueous solution at 20° C. of between about 15 and 55 centipoises and the dispersed phase of which consists mainly of 4,4'-dichlorodiphenyl-1,1,1-trichloroethane and a lesser quantity of a solvent for 4,4'-dichlorodiphenyl-1,1,1-trichloroethane.

7. The composition of claim 2 in which the dispersed phase constitutes from about 15 to about 30% of the dispersion.

8. The composition of claim 5 in which the dispersed phase constitutes from about 15 to about 30% of the dispersion.

9. The composition of claim 6 in which the dispersed phase constitutes from about 15 to about 30% of the dispersion.

10. The method of stabilizing an aqueous dispersion of 4,4'-dichlorodiphenyl-1,1,1-trichloroethane in an aqueous solution of a water-soluble partially hydrolyzed polyvinyl acetate which comprises incorporating in said 4,4'-dichlorodiphenyl-1,1,1,-trichloroethane a lesser amount of a water-insoluble solvent for 4,4'-dichlorodiphenyl-1,1,1-trichloroethane.

GORDON F. BIEHN.
JAMES E. KIRBY.

REFERENCES CITED

The following references are of record in the file of this patent:

UNITED STATES PATENTS

| Number | Name | Date |
|---|---|---|
| 2,329,074 | Muller | Sept. 7, 1943 |
| 2,098,836 | Ressler | Nov. 9, 1937 |

OTHER REFERENCES

Polyvinyl Alcohol, R. & H. Technical Bulletin, published E. I. Du Pont de Nemours and Co., Wilmington, Delaware, copyright 1940, page 2 and 8. (Copy in Division 50.)